United States Patent [19]
Schutz

[11] Patent Number: 5,248,975
[45] Date of Patent: Sep. 28, 1993

[54] GROUND PROBING RADAR WITH MULTIPLE ANTENNA CAPABILITY

[75] Inventor: Alan E. Schutz, Newburyport, Mass.

[73] Assignee: Geophysical Survey Systems, Inc., North Salem, N.H.

[21] Appl. No.: 721,040

[22] Filed: Jun. 26, 1991

[51] Int. Cl.⁵ .............................................. G01S 7/282
[52] U.S. Cl. ...................................... 342/21; 342/22; 342/202
[58] Field of Search ............... 342/22, 70, 179, 21, 342/202, 204

[56] References Cited

U.S. PATENT DOCUMENTS

| | | | |
|---|---|---|---|
| 3,909,827 | 9/1975 | Tricoles et al. | 342/179 |
| 5,008,678 | 4/1991 | Herman | 342/70 X |
| 5,084,706 | 1/1992 | Ross et al. | 342/202 X |

FOREIGN PATENT DOCUMENTS 2165701  4/1986  United Kingdom ................. 342/22

Primary Examiner—Gilberto Barron, Jr.
Attorney, Agent, or Firm—Wolf, Greenfield & Sacks

[57] ABSTRACT

A ground probing radar system comprising a plurality of antennas for transmitting. Where for each transmitting antenna, an associated individual driver means selectively operable in response to an enabling signal unique to each antenna. Upon receiving a triggering signal, the driver means supplies to its associated antenna a single impulse of power to be radiated. Further providing that a means for supplying the trigger signal to each of the driver means only one at a time, thereby insuring that no two antennas are supplied power to be radiated at the same time.

8 Claims, 12 Drawing Sheets

GROUND PROBING RADAR WITH MULTIPLE ANTENNA CAPABILITY

FIELD OF THE INVENTION

This invention relates to a radar system and, more particularly, to a surface-probing radar system capable of using multiple antennas for both transmitting and receiving, and capable of ensuring that no two transmit antennas are transmitting at the same time.

BACKGROUND OF THE INVENTION

Ground probing radar systems have been used for many years to investigate subsurface conditions of the earth's crust and to locate buried objects and the like. A typical ground probing radar system according to the prior art includes an antenna system, a pulse generator for supplying transmit pulses to the antenna system and a receiver for receiving the returned radar signal impinging on the antenna system and for converting the received signal into a useful image.

The conversion of the received signal into a useful image can be a complicated process. Typically, a variety of signal processing operations may be applied to the received signal to remove noise from the signal, to distinguish the useful information from unwanted information, and so forth. This processing frequently applies to the received signal a gain function which varies with time and, correspondingly, with the instantaneous depth of the scattering or reflective media which returned the received echo.

As with all radar systems, the performance of ground probing radar systems depends on many factors. One of the more important factors, as suggested above, is the antenna system employed. Antenna pattern, aperture, gain and other factors affect the amount of power needed, the depth to which the ground can be probed, the detection sensitivity, the focus of the received image, and so forth. For these reasons, there is no such thing as one ideal antenna. Users have, in the past, sometimes desired to switch antennas from time to time in order to take advantage of, or get away from, the particular characteristics of one or more of the available antennas. For example, the user may notice in the image produced using a first antenna, a feature he or she would like to examine more closely using a second antenna. Since, as stated above, the antenna performance and the signal filtering are closely related, when an antenna is changed it is also necessary, generally, to change the received signal filtering. This might involve anything from a physical hardware change (i.e.., removing and inserting filter modules), to changing switch or control settings. In any event, time is required for disconnecting one antenna, connecting another antenna, and establishing the new filter conditions; even if no more than one switch need be reset, the filters will need some time to settle.

Accordingly, there exists a need for a radar system, particularly a ground probing radar system, which provides the capability to attach and rapidly switch between a plurality of antennas.

SUMMARY OF THE INVENTION

The aforementioned need is met in a ground probing radar system which employs a transducer interface module between the transmitting and receiving circuitry, on the one hand, and one or more antennas, on the other hand. The interface module includes connectors for attachment to one or more antennas and, associated with each connector, protection circuitry to prevent injury to the equipment and the user when antennas are connected and disconnected. The transducer interface module, in response to appropriately timed control signals, further controls the transmitting antennas to cause them to transmit in a defined sequence, so that no two antennas can be activated at the same time. A digital signal processing subsystem provides all received signal filtering, facilitating near zero settling time for the filters when filter characteristics are changed. This permits automatic switching of antennas between scans, so that a real-time on-screen image comparison is possible between images produced by different antennas or with different filtering (even with a single antenna). (This is not possible in the prior art even with multiple transmitters, each using its own selected antenna, as the signals from multiple antennas or multiple transmitters could interfere with one another, making difficult or impossible the task of isolating the received response to each transmitted signal.) Also, different antennas can readily be selected for transmitting and for receiving.

The invention will be more fully understood from the detailed description presented below, which should be read in conjunction with the accompanying drawing.

BRIEF DESCRIPTION OF THE DRAWING

In the drawings,

FIGS. 2A-1, 2A-2 and 2B-2F are schematic circuit diagrams for a transducer interface module, according to the invention; and FIGS. 3-1, 3-2 and 3-3 are schematic circuit diagrams of a portion of a radar board for use in the present invention to select a received signal for processing and to perform certain preliminary processing of the selected signal.

DETAILED DESCRIPTION

Figure 1:
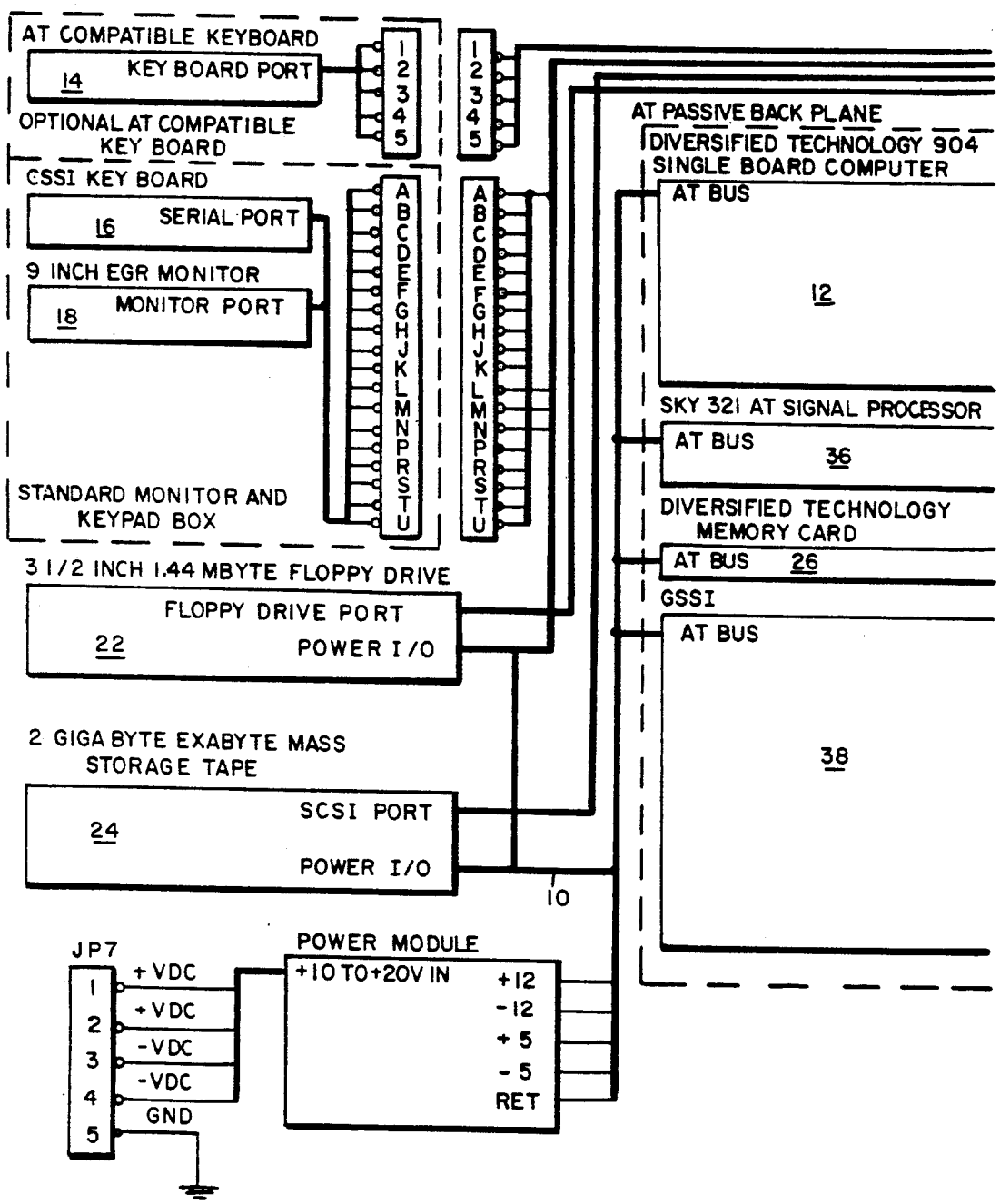
FIGS. 1-1 and 1-2 are block diagrams of a ground probing radar with multiple antenna capability, according to the present invention.
Figures 1, 2:
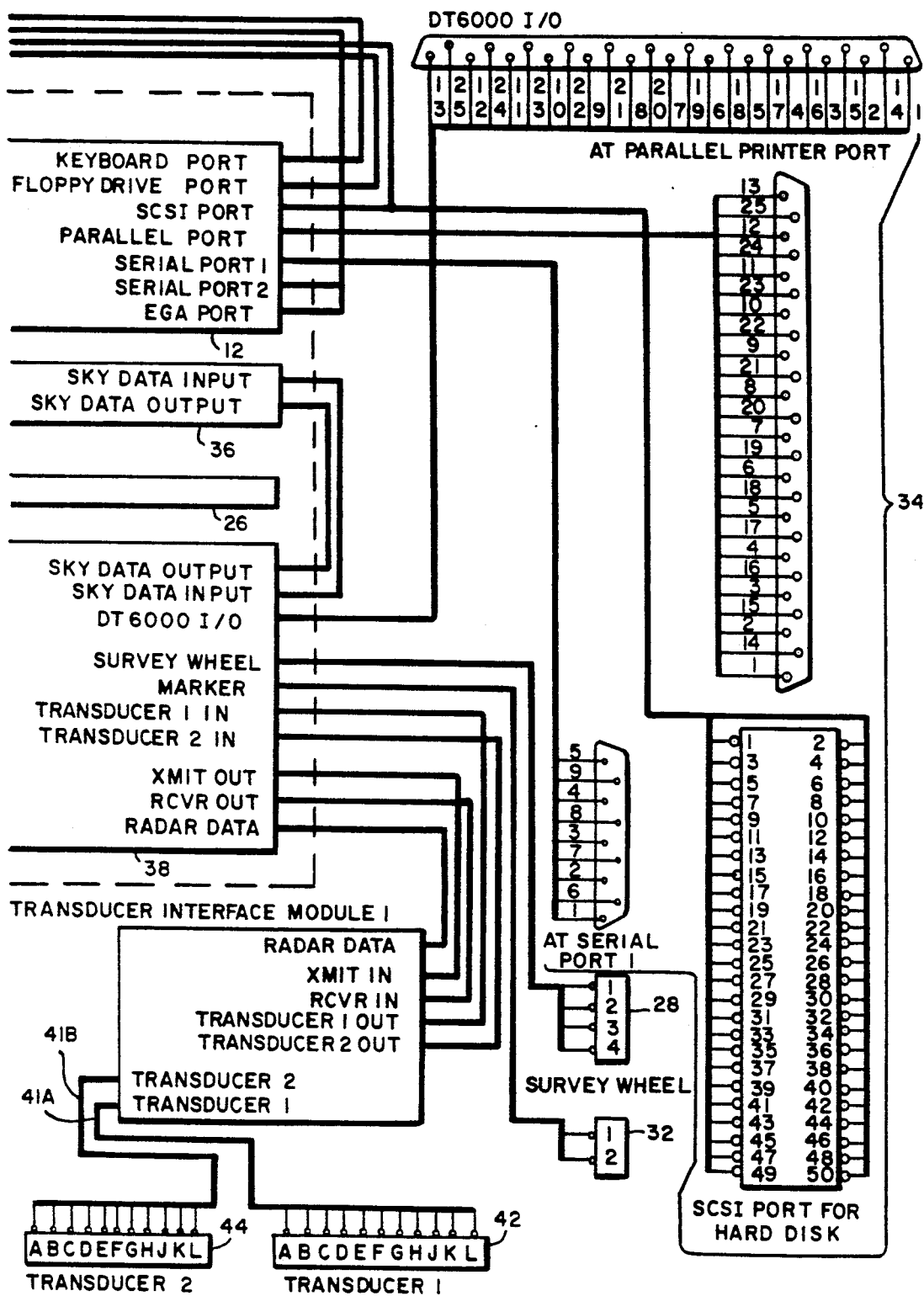
Figures 1, 2A:
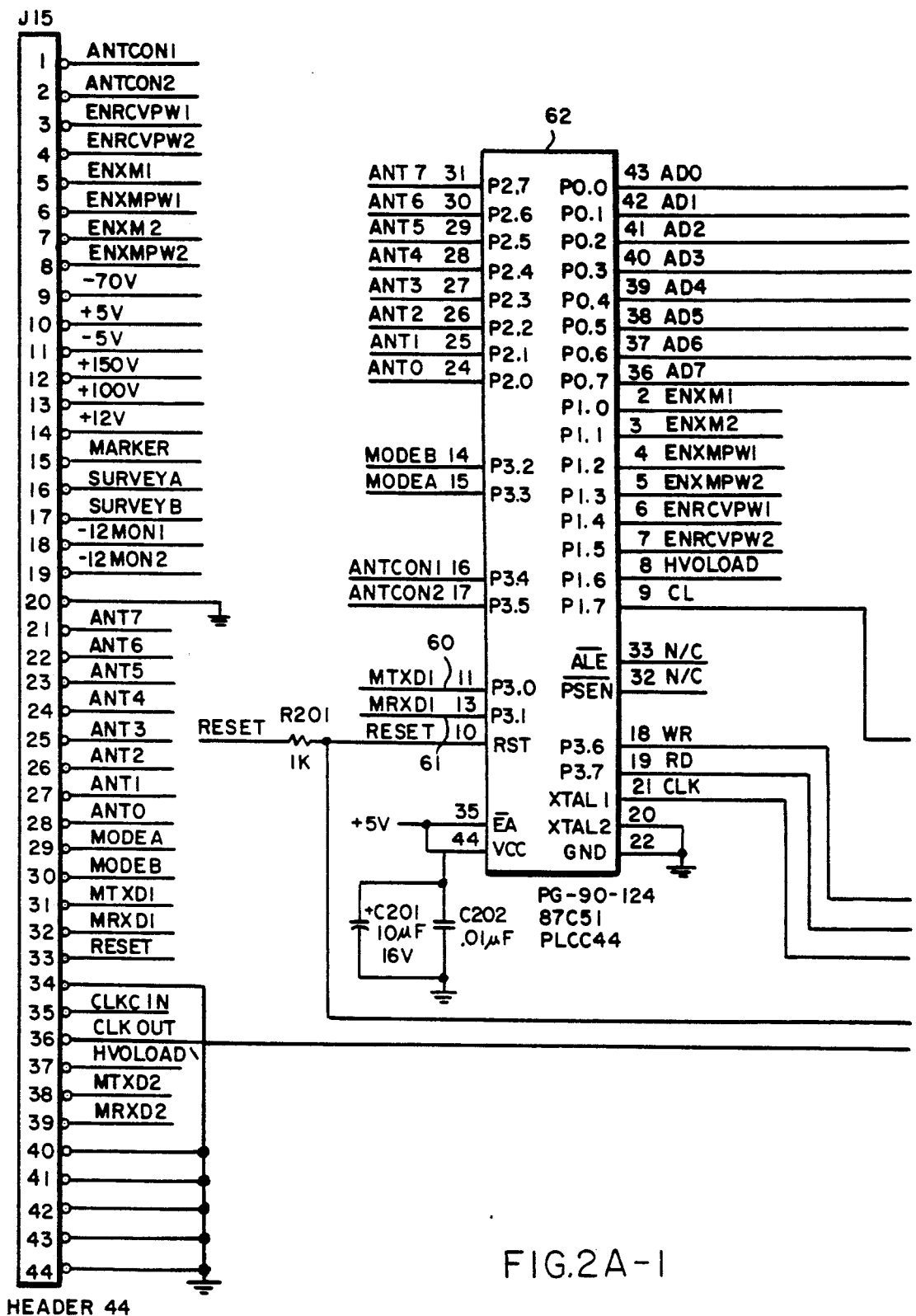
Figures 2, 2A:
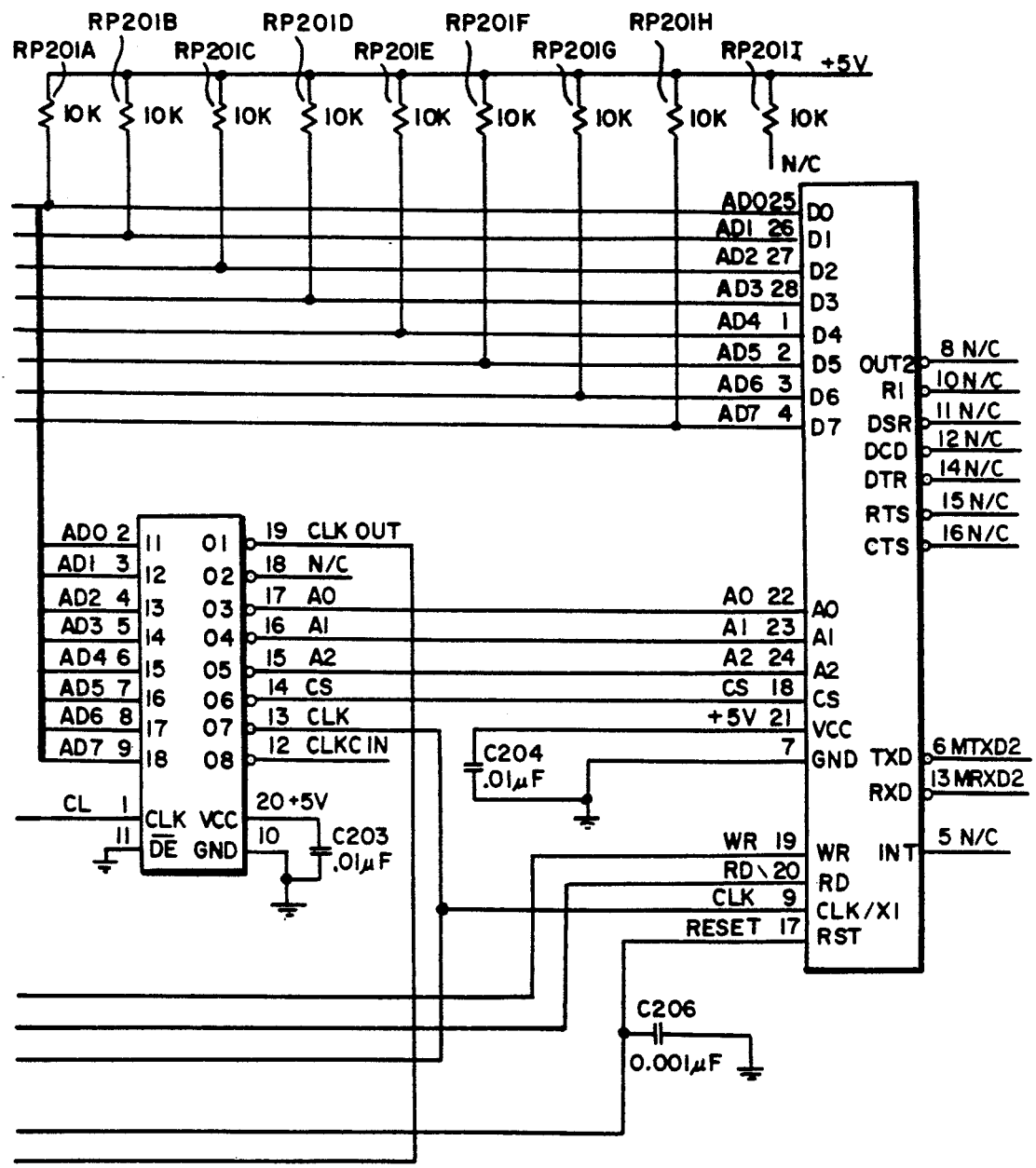
Figure 2B:
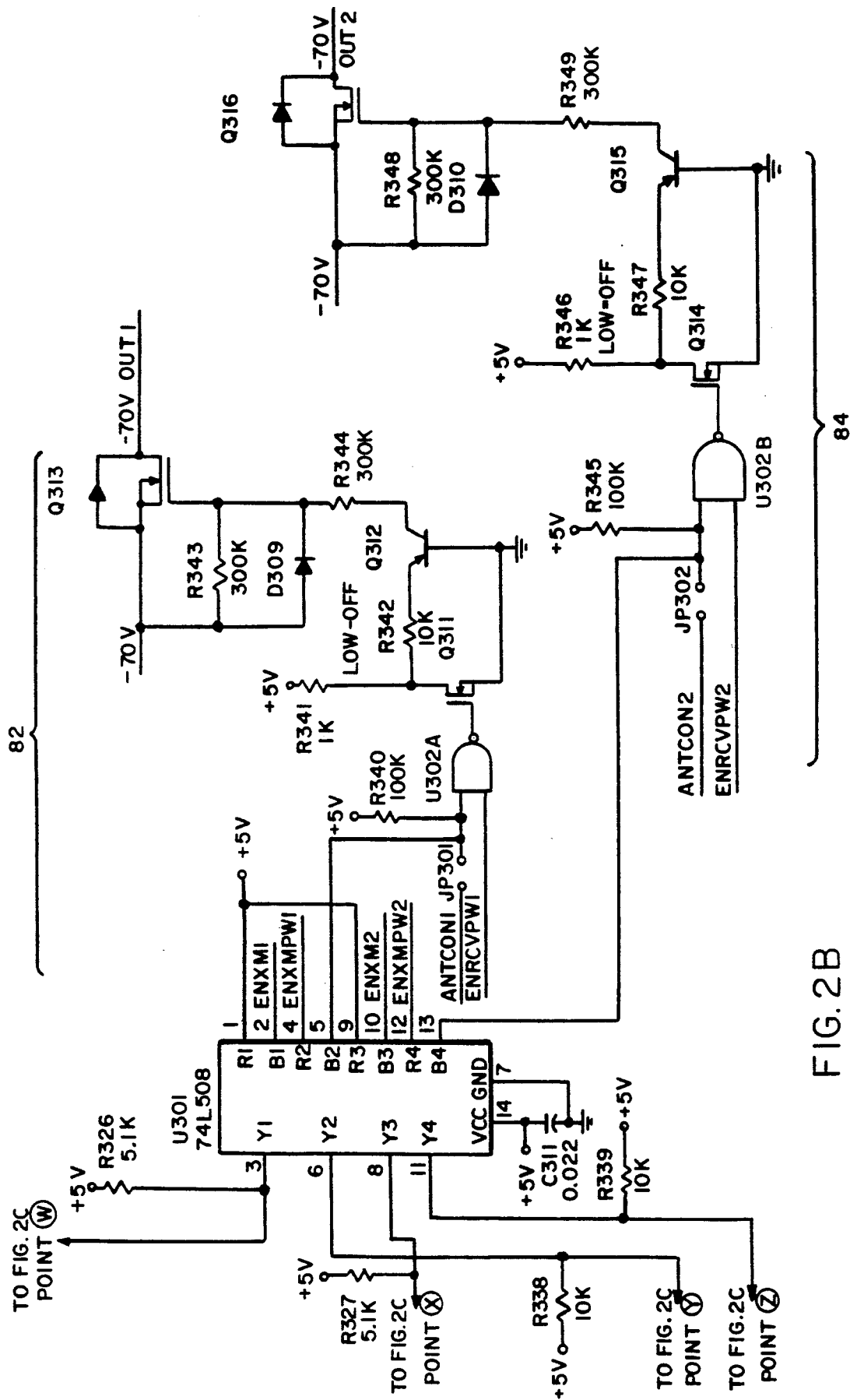
Figure 2C:
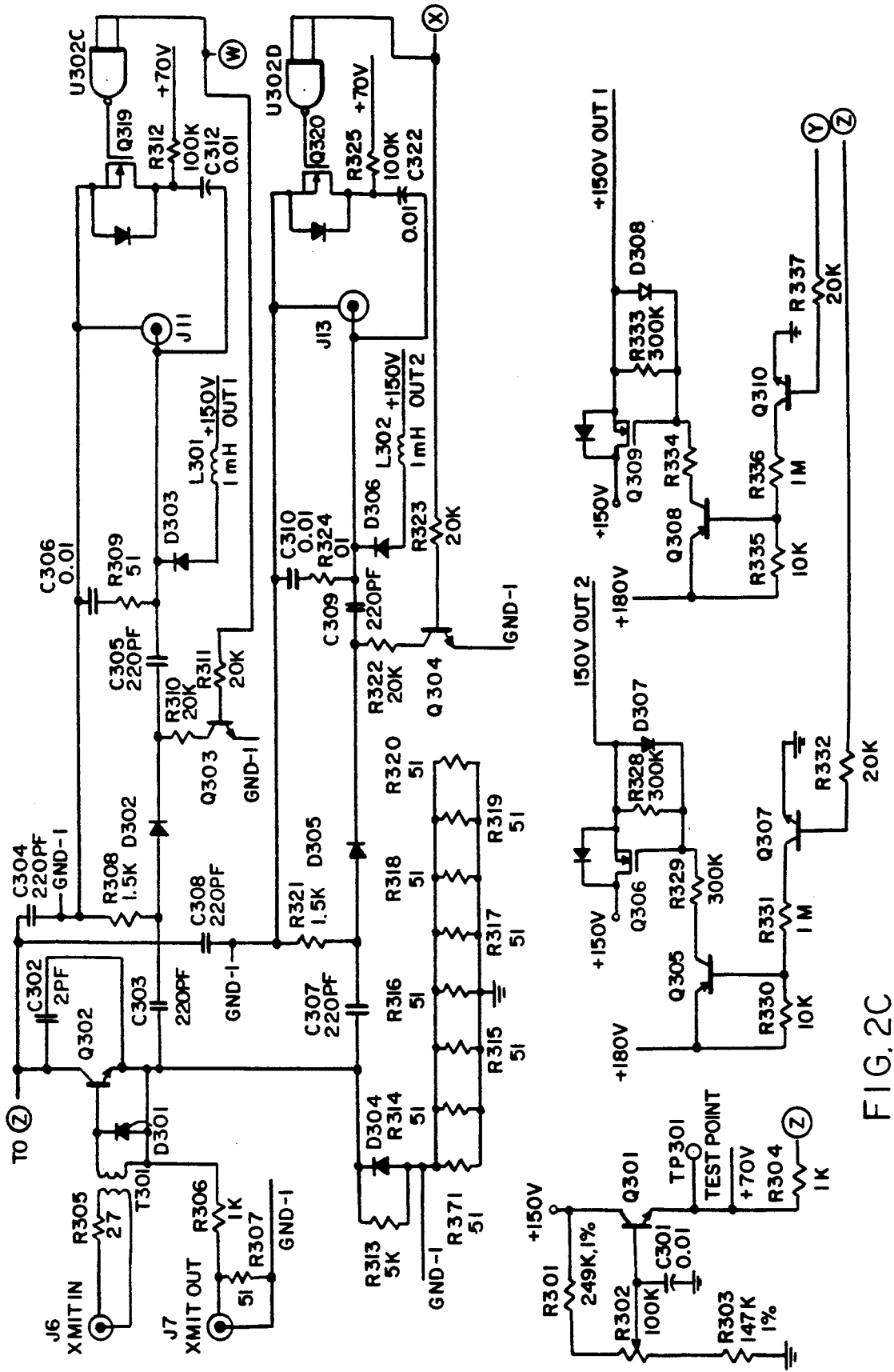
Figure 2D:
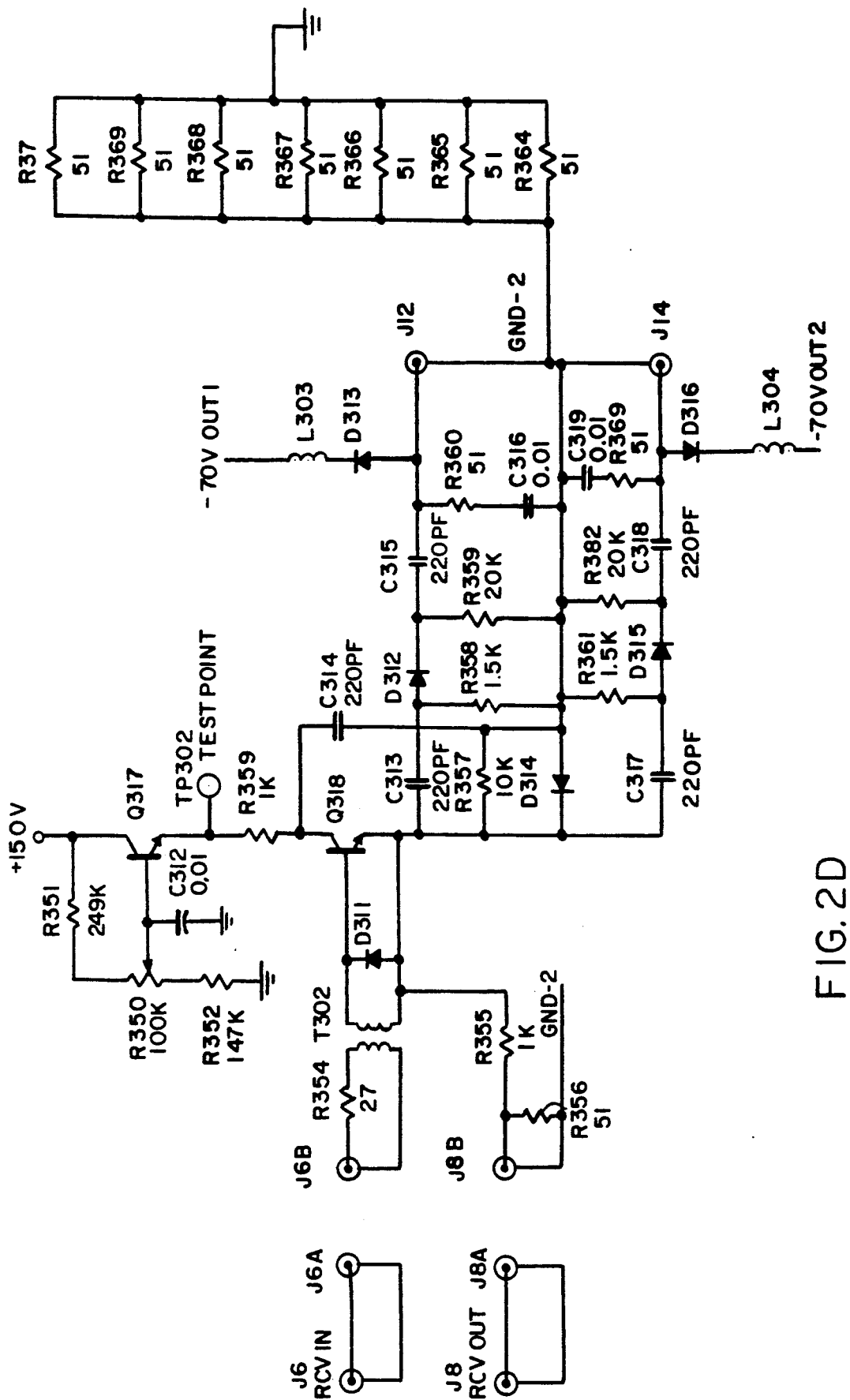
Figure 2E:
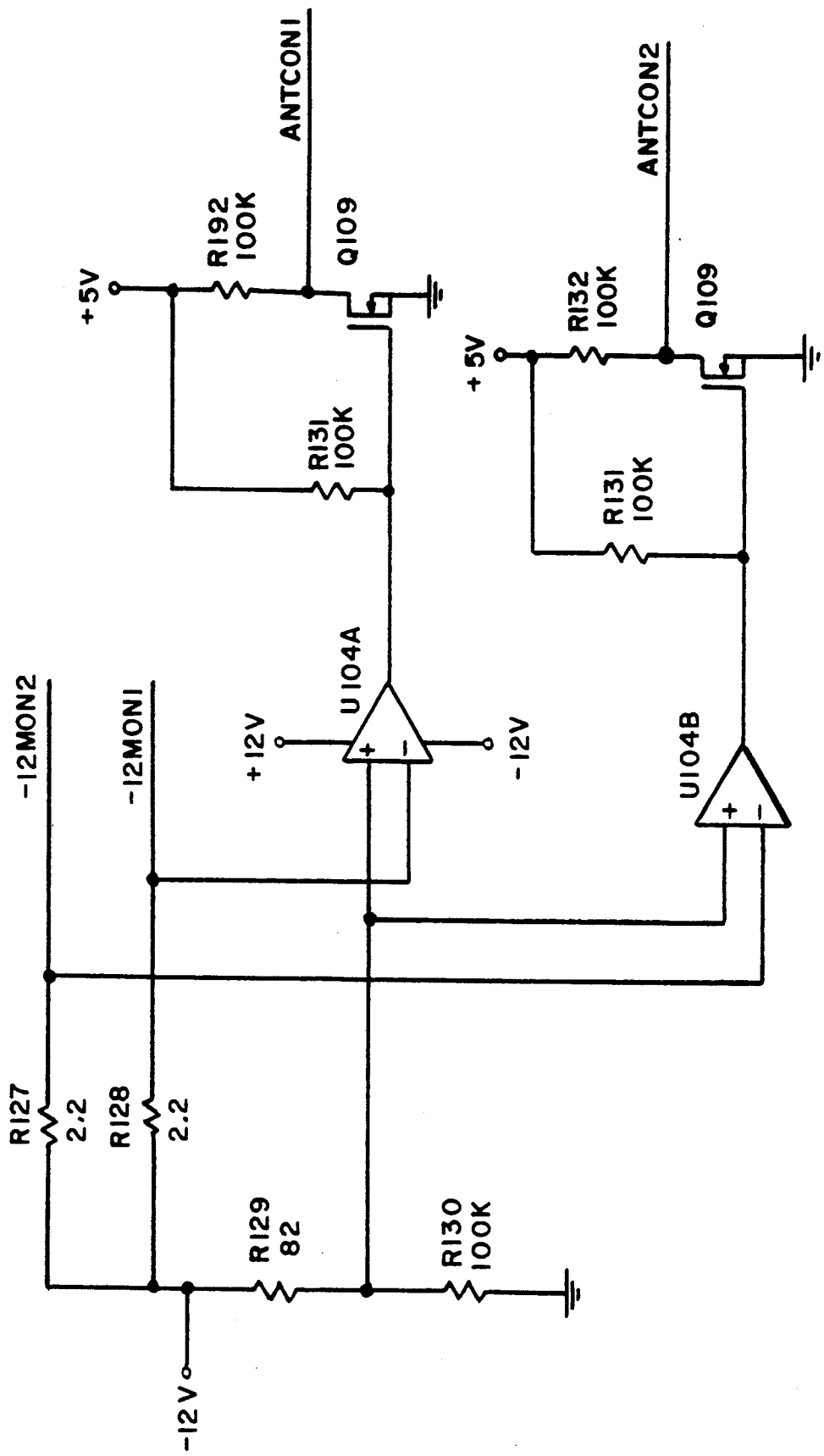
Figure 2F:
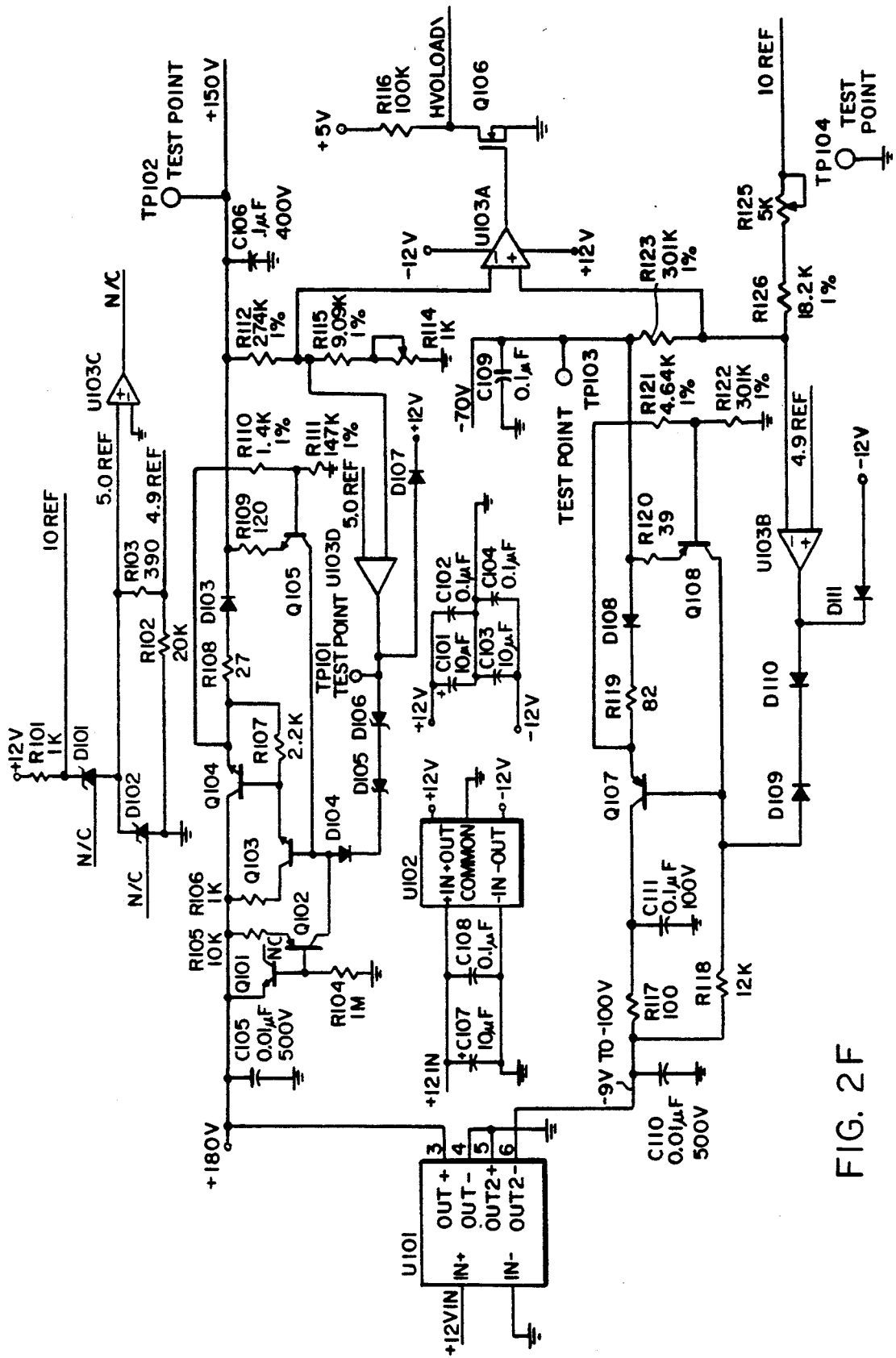

Referring now to FIG. 1, there is shown a block diagram of a ground probing radar system according to the invention. The principal blocks of the system are: a bus 10 for distributing power and signals among the modules of the system; a computer 12 having thereon a central processing unit (CPU) and appropriate input-/output (I/O) ports for interfacing with I/O devices such as storage media, a keyboard and a CRT; a keyboard 14; a keypad 16; a CRT monitor 18; a floppy disk drive 22; a tape drive or other mass storage unit 24; a semiconductor memory card (i.e., RAM and/or PROM) 26; a survey wheel 28; a marker connector 32; a variety of I/O connectors shown collectively at 34; a digital signal processor 36; a radar board 38; and one or more transducer interface modules 40, each having a plurality of ports such as ports 41A and 41B wired to connectors 42 and 44, respectively, each for connection to an antenna (not shown, as the details of the antennas are outside the scope of this disclosure).

The Radar Board

Radar board 38 generates two signals for activation of the transmitting antennas: a high voltage signal and a timing pulse. These signals are supplied to the transducer interface modules (TIMs) and via the TIMs, to the transmit antennas at appropriate times.

The radar board also generates high voltage (i.e., power) and timing signals for the receive antennas, which are also supplied to the receive antennas via the TIMs.

The signals from the receiving antennas are supplied to the radar board via the TIMs without processing. The radar board selects, for each instant, the received signal to be processed and the processing to be applied to the signal. It passes the received signal through a variable gain stage and then digitizes the gain-adjusted signal for processing by the digital signal processor 36.

The Transducer Interface Module(s)

Each transducer interface module (TIM) performs a number of functions. (Each TIM is designed to connect to two transmit antennas and two receive antennas, though there is no requirement for two antennas. Depending on the number of antennas to be connected, more than one TIM may be employed.) First, for transmission, it controls when each of the antennas will be "fired"—i.e.., when a transmit pulse will be applied to the antenna. Second, for receiving, it routes the signals from the receiving antennas to the digital signal processor. Third, it implements safety features which are discussed below.

Transmitting

Considering first the transmitting function, the TIM 40 (an exemplary embodiment of which is shown in FIGS. 2A-2F) generates and supplies to a transmit driver for each antenna a high voltage signal which will be supplied to the antenna in response to a control signal. The control signal is a transmit pulse which the TIM receives from the radar board via jack J6 or J7. This pulse, of approximately 10 ns duration, is supplied to the driver circuits for each of the transmit antennas. That is, the TIM supplies the pulse to a first antenna's transmit driver for an entire scan; then, after a predetermined delay, for the next scan, it supplies a like pulse to a second antenna's transmit driver; and so on until all of the transmit antenna drivers have received the pulse. Consequently, only one transmit antenna is activated at a time and the available transmit antennas are activated in sequence under the control of the radar board.

To perform this operation, of course, the system must establish a sequence for triggering, or firing, each of the available transmit antennas. Assume there is only one TIM and it is connected to two transmit antennas. Referring now to FIGS. 2A-2F, the radar board 38 issues to the TIMs 40, via serial transmit control line 60 instructions which tell the TIM whether to enable (high voltage) power to each of the TIM's transmit antennas. A processor or decoder 62 monitors and decodes the control instructions and when a transmitting antenna is to be energized, asserts the respective high voltage enabling signal ENXM1 or ENXM2.

The trigger pulse for the antenna is supplied from the radar board to connector J6 of the TIM. This turns on an avalanche transistor Q302. When the particular transmitter is enabled, by assertion of the ENXM1 or ENXM2 signal, respectively, transistor Q303 or Q304 is turned on and a pulse from the avalanche transistor is fed to the transmit antenna jack J11 or J13, where it is superimposed on a 150 volt dc voltage which is also supplied to the antenna, for power.

Actuation of the 150 volt supplies is controlled by the signals ENXMPW1 and ENXMPW2, which are supplied, via gates U301, to power switches 72 and 74. The two power switches receive an unswitched 150 volt signal and provide switched output voltages +150 V—OUT1 and +150 V—OUT2, respectively.

Receiving

In contrast with the transmitters, timing pulses are supplied continuously (via jacks J6, J6A, and J6B) to all active receive antennas. At the receive antenna jacks J12 and J14, these pulses are superimposed on a −70 volt level, which supplies power to the antenna electronics whenever the switched power signal −70 V OUT1 or −70 V OUT2 is turned on. A receive antenna may be turned off by turning off the high voltage (−70 V OUT1 or −70 V OUT2) for its electronics, if the antenna is not in use.

The radar board selects the receive antenna whose signal is to be processed. The received signal is processed in the radar board, using a progressive sampling technique such as is employed in a sampling oscilloscope, thereby "downconverting" the processed signal to the audio spectrum from baseband.

Figures 1, 3:
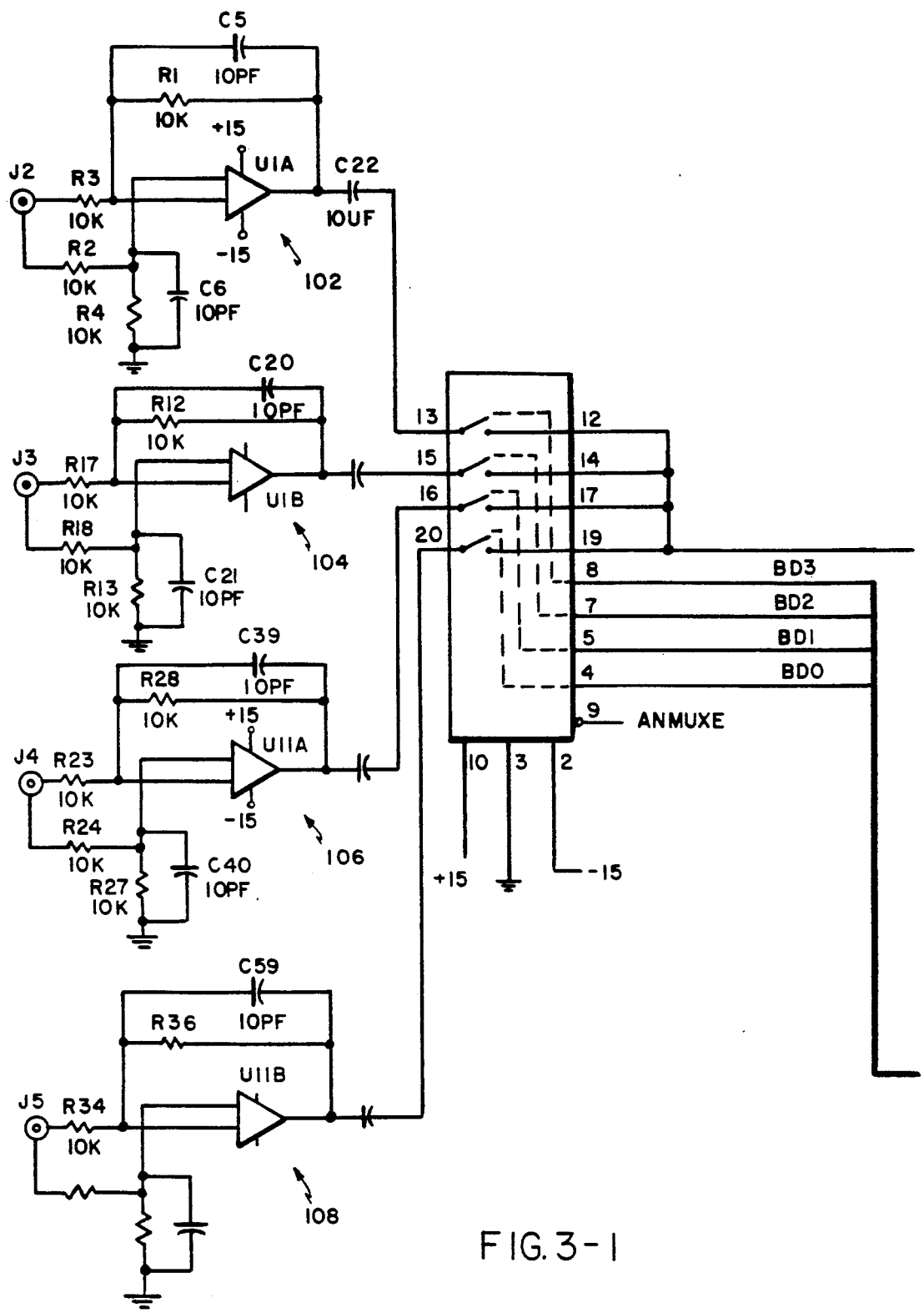
Figures 2, 3:
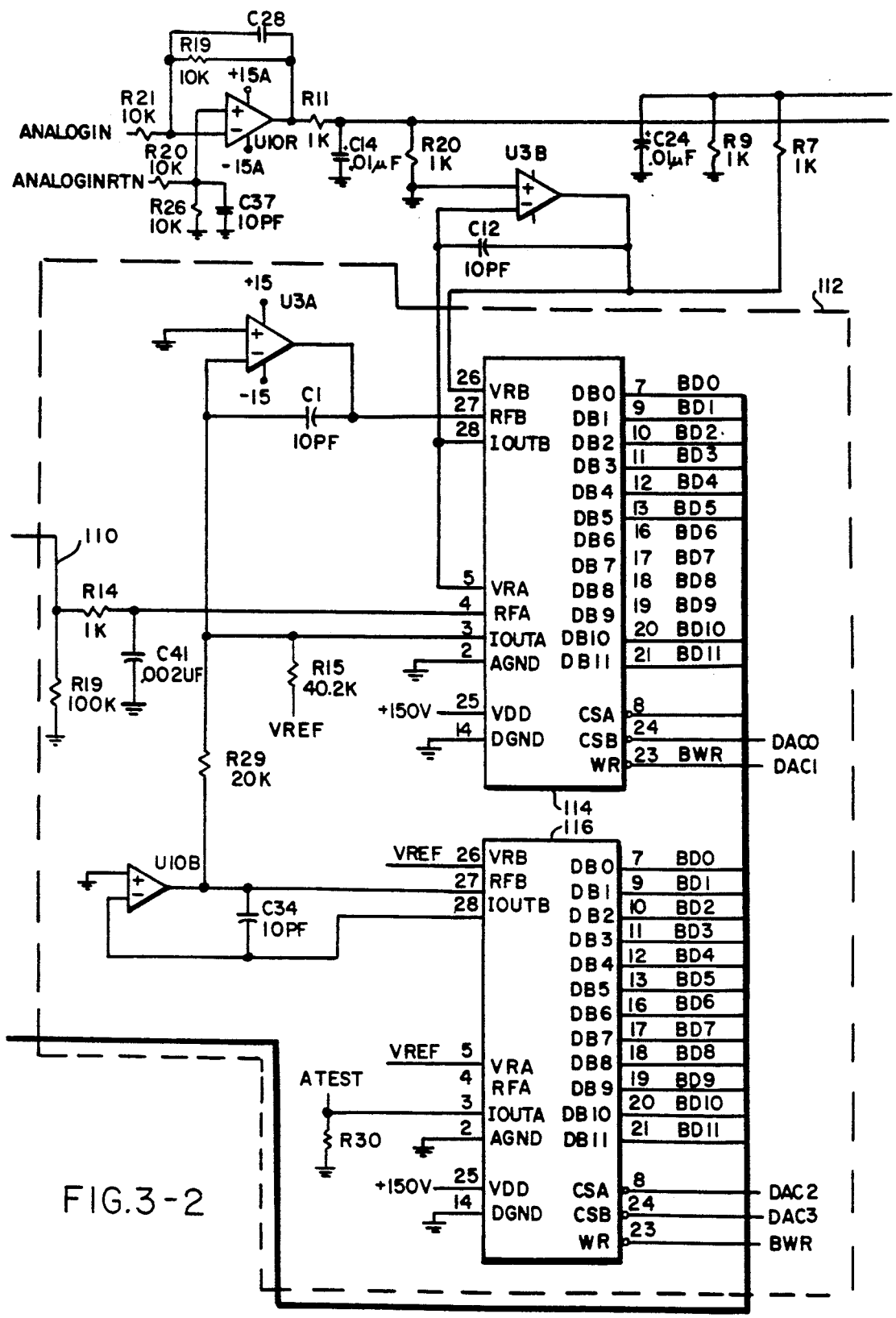
Figure 3:
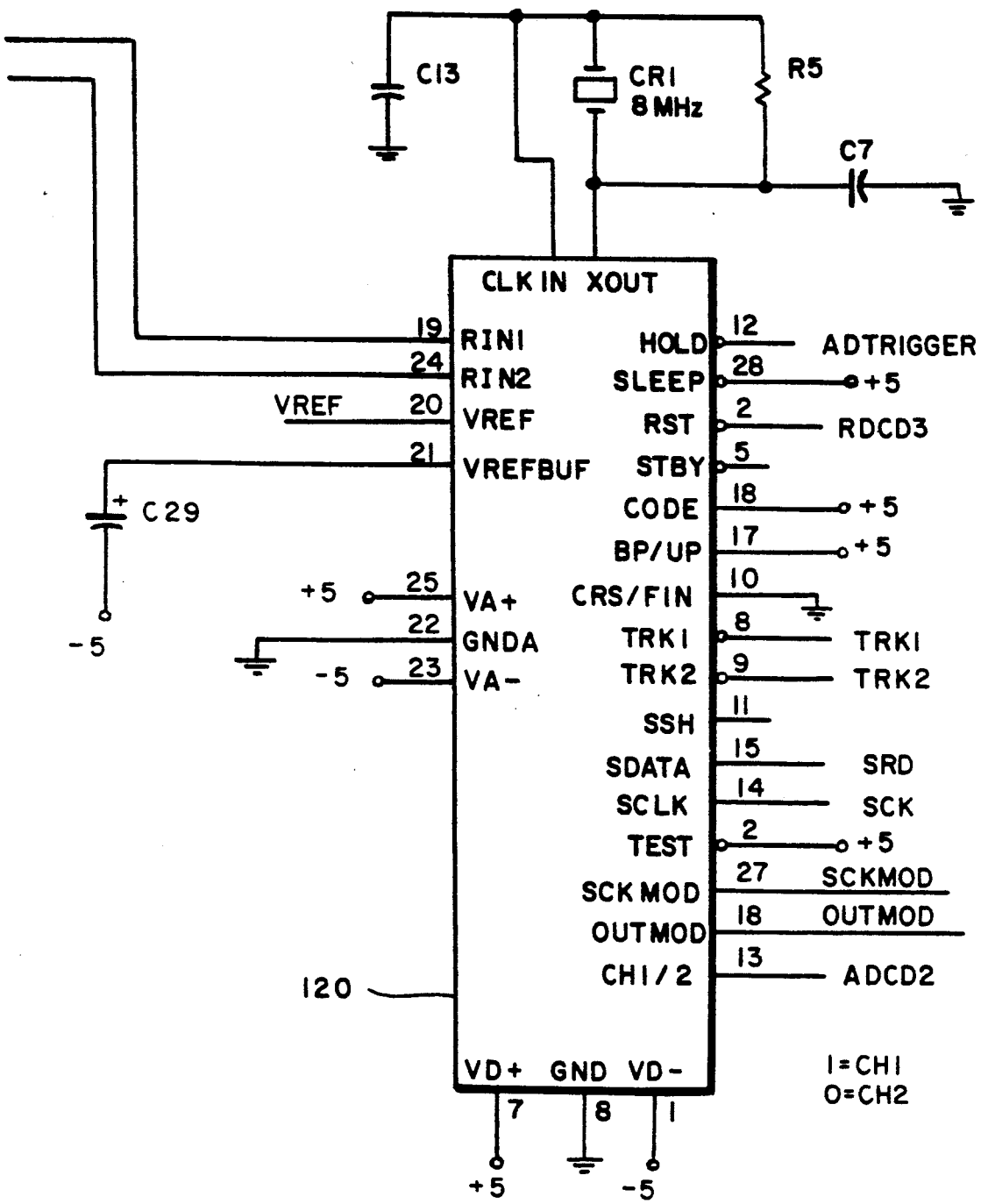

Each transmitting antenna is paired with a receiving antenna; the pairings are supplied by the operator via keyboard or other input. The same receiving antenna may be paired with more than one transmitting antenna. Operationally, the pairings are effected by coupling the selected receive antenna to the receive channel in the radar board at an appropriate time to receive and process the returning echo for the corresponding transmit pulse. More particularly, referring to FIG. 3 which shows a portion of the radar board circuitry, each receive antenna supplies a receive signal at jacks J2-J5 (assuming provision is made for four receive channels) which is filtered in filters 102, 104, 106, and 108 and then is supplied to one input of a selection switch, or multiplexer, U8. The latter, under control of a set of control signals labelled BD0-BD3, selects the signal on one of the inputs, to be supplied at its output on line 110 as the received signal to be processed. The received signal is amplified by a variable gain amplifier 112 formed with a pair of multiplying digital to analog converters (DACs) 114 and 116. The output of the amplifier (after some minor filtering) is digitized by an analog to digital converter 120, to provide digital samples of the received signal. As mentioned above, each sample is taken at a successive point in the received periodic waveform, as is done in sampling oscilloscopes, to "downconvert" the received signal.

Protection Circuits

The receive antenna high voltage is turned off, for safety, if a receive antenna is not connected to the antenna connector of the TIM. This protective function is provided in the TIM by circuits 82 and 84, which are controlled by a first signal, ANTCON1 or ANTCON2, which is asserted only if a receive antenna is connected to the antenna jack, and by a second signal, ENRCVPW1 or ENRCVPW2, which is generated by the radar board (and decoded by the TIM) only when the antenna is to be used.

Similarly, if processor 62 deasserts the signals ENXMPW1 and ENXMPW2, high voltage for the transmit antennas is prevented from reaching the transmit antenna jacks.

Chaining Multiple TIMs

FIGS. 2B-2F show how the antenna and timing pulse signals are distributed when multiple TIMs are used. The control signals are distributed via the circuitry of FIG. 2A. In addition to decoding a serial command stream on lines 60 (for transmitting) and 61 (for receiving), the three "chips" of FIG. 2A act essentially as a repeater, passing along to the next TIM the control signals.

The radar board determines how many TIMs and transmitting antennas are connected to the system, and the sequence in which the antennas are to be fired; the sequence, of course, depends on user selection of antennas. The transmit trigger pulse supplied to input jack J6 of a first TIM is supplied also, by the TIM, to an output jack J7. If another TIM is present, a cable is run from the first TIM's jack J7 to the second TIM's jack J6. Thus, all TIMs receive the transmit pulse in a "daisy chain" sequence, but substantially simultaneously. Of course, only those antennas will be actuated whose driver circuits (in the TIMs) are energized—i.e., have their 150 volt supplies turned on.

Having thus described the basic concept of the invention, it will be readily apparent to those skilled in the art that the foregoing detailed disclosure is intended to be presented by way of example only, and is not limiting. Various alterations, improvements, and modifications will occur and are intended to those skilled in the art, though not expressly stated herein. These modifications, alterations, and improvements are intended to be suggested to be suggested hereby, and are within the spirit and scope of the invention. Accordingly, the invention is limited only by the following claims and equivalents thereto:

What is claimed is:

1. A radar system comprising:
   a. a plurality of antennas for transmitting;
   b. for each transmitting antenna, an associated individual driver means selectively operable in response to an enabling signal unique to said antenna, upon receiving a triggering signal, for supplying to the associated antenna a single impulse of power to be radiated; and
   c. means for supplying said trigger signal to each of said driver means, but only to one of said driver means at a time, such that no two antennas are supplied power to be radiated at the same time.

2. The radar system of claim 1 further including means for supplying only one enabling signal at a time, thereby avoiding multiple simultaneous antenna operation.

3. The radar system of claim 1 wherein said driver means includes
   1. an avalanche transistor circuit for generating in response to receipt of a trigger signal a voltage impulse, and
   2. means responsive to the enabling signal for gating said impulse to the antenna.

4. The radar system of claim 2 or claim 3 further including means for supplying high voltage power to each transmit antenna and means for disabling the means for supplying high voltage power if an antenna is not connected to said driver means.

5. A radar system comprising:
   a plurality of antennas for transmitting;
   for each transmitting antenna, an associated individual driver means including first connector means for receiving a triggering signal and second connector means electrically interconnected to said first connector for supplying a triggering signal output which may thereby be connected to another driver means, each driver means being selectively operable in response to an enabling signal supplied thereto, upon receiving said triggering signal, for supplying to the associated antenna a single impulse of power to be radiated;
   means for supplying said triggering signal; and
   means for supplying an enabling signal to each of said driver means but only to one driver means at a time.

6. The radar system of claim 5 wherein the means for supplying the enabling signals is a processor which is programmable to permit the plurality of driver means to be operated in any desired sequence.

7. A radar system constructed and arranged in a modular fashion, comprising:
   a. a processing unit;
   b. at least one input/output device;
   c. at least one input/output port for interfacing the processing unit with each input/output device;
   d. at least one memory unit;
   e. a radar board unit; and
   f. at least one transducer interface module, each transducer interface module having a plurality of ports wired to connectors, each for connection to an antenna;
   the radar board unit including means for generating a high voltage signal and a timing pulse signal for activation of transmitting antennas, via the transducer interface modules, at appropriate times, and further including means for generating high voltage and timing signals for receive antennas, supplied to said receive antennas via the transducer interface modules;
   each transducer interface module including means for controlling the application of a transmit pulse to each of its antenna connectors and means for routing received signals from antenna connectors to receive signal processing circuitry.

8. The radar system of claim 7 wherein each transducer interface module receives a plurality of control signals from the radar board unit and wherein each transducer interface module further comprises means for decoding a serial command stream from the radar board unit, means for receiving control signals from the radar board unit, and means for supplying to a connector, to which another transducer interface module may be connected, a copy of said control signals, whereby a transmit trigger pulse supplied to a first transducer interface module in the system will be distributed in a "daisy chain" sequence to all transducer interface modules in the system.

* * * * *